Patented Sept. 5, 1939

2,172,083

UNITED STATES PATENT OFFICE 2,172,083

METHOD OF TREATING INORGANIC MINERAL SLIMES IN OIL WELLS

Abraham M. Herbsman, Huntington Park, Calif., assignor to Industrial Patents, Ltd., Los Angeles, Calif., a corporation of California No Drawing. Application May 18, 1937, Serial No. 143,329

3 Claims. (Cl. 166—21)

My invention relates to the production of petroleum from wells, and particularly to the combating of slime conditions which occasionally occur in these wells.

In producing oil from wells, the seepage of oil into the well is sometimes interfered with by the occurence of slimes which adhere to the walls of the well so as to effectively retard the passage of oil from the oil-bearing strata.

It is an object of my invention to provide a method of treating inorganic mineral slimes where these occur in oil wells so as to break up these slimes and thereby cause an increased flow of oil.

Inorganic mineral slimes as found in deep oil wells vary in composition. Some of these are carbonate in character; others are of a siliceous nature, while others consist of a shale-like material.

Another object of this invention is to provide a method of treating inorganic mineral slimes in oil wells which are predominantly carbonate in character.

A further object of the invention is to provide a method of treatment of inorganic mineral slimes in oil wells, which is effective in the disposition of such slimes where these are of a siliceous nature.

A still further object of the invention is to provide a method of treatment of inorganic mineral slimes in oil wells which is effective in breaking down such slimes when the latter have a shale-like base.

The method of treatment comprised in my invention has certain similar features in treating all of the aforesaid specific types of slimes. In each instance, the method comprises forming an aqueous suspension of a sulfonated glyceride, and introducing said suspension in the bottom of the well containing the inorganic mineral slimes which it is desired to treat. When this introduced, this suspension breaks down the inorganic mineral slimes with which it comes in contact and prevents the formation of such slimes as long as substantial traces of said suspension remain present in the bottom of the well. The sulfonated glyceride used in my invention may be made by sulfonation of any of the well-known animal or vegetable fats such as fish oil, castor oil or the like.

The basic character of the inorganic mineral slimes found in deep oil wells varies in accordance with the nature of the minerals contained therein. As pointed out hereinabove, the main types of these inorganic mineral slimes are the carbonate type, the siliceous type and the shale-like type.

In treating a slime of the carbonate type, the treating agent is produced by forming a suspension of sulfonated glyceride with an aqueous acid solution. The acids usually used in this solution are hydrochloric acid or acetic acid. As used in the forming of said suspension, these acids are usually fairly dilute, and preferably are from 2% to 20% in strength.

When treating a slime of the siliceous type by my method, I form a suspension of the treating agent with an aqueous alkaline solution, such as aqueous caustic soda, or aqua ammonia. Where aqua ammonia is used, this may be of commercial strength, which is 26° Bé., or it may be considerably diluted from commercial strength.

In treating a slime which is shale-like in nature, the treating agent or sulfonated glyceride is preferably mixed with water to form an aqueous suspension of the glyceride, and is thus introduced into the bottom of the well.

In many cases, I have found the effectiveness the sulfonated glyceride prior to the forming of of my method is enhanced by the dilution of an aqueous suspension of the latter. In carrying out my method in this manner, I preferably use a diluent from the group comprising benzol and its homologues, aliphatic alcohols, aromatic alcohols, phenols, pyridine, alcoholic solutions of calcium chloride and the like, and mineral hydrocarbon solvents.

What I claim is:

1. A method of treating the inorganic mineral slimes occurring in oil wells, which comprises forming an aqueous suspension of a sulfonated glyceride and introducing said suspension into that portion of a well in which there are accumulations of said slime.

2. A method of treating the inorganic mineral slimes occurring in oil wells, which comprises forming an aqueous suspension of a sulfonated glyceride in an aqueous acid solution and introducing said suspension into that portion of a well in which there are accumulations of said slime.

3. A method of treating the inorganic mineral slimes occurring in oil wells, which comprises forming an aqueous suspension of a sulfonated glyceride in an aqueous alkaline solution and introducing said suspension into that portion of a well in which there are accumulations of said slime.

ABRAHAM M. HERBSMAN.